United States Patent [19]

Nakashima et al.

[11] Patent Number: 4,768,121
[45] Date of Patent: Aug. 30, 1988

[54] MAGNETIC HEAD FORMED BY COMPOSITE MAIN POLE FILM AND WINDING CORE FOR PERPENDICULAR MAGNETIC RECORDING

[75] Inventors: Keishi Nakashima; Tetsuya Iwata; Yasuo Tanaka; Toshiaki Hashidate, all of Nagaoka, Japan

[73] Assignee: Alps Electric Co., Ltd., Japan

[21] Appl. No.: 948,024

[22] Filed: Dec. 31, 1986

[30] Foreign Application Priority Data

Feb. 19, 1986 [JP] Japan .................. 61-34117

[51] Int. Cl.⁴ .................. G11B 5/12; G11B 5/60; G11B 15/64
[52] U.S. Cl. .................. 360/125; 360/103; 360/122
[58] Field of Search .............. 360/103, 102, 122, 125, 360/126

[56] References Cited

U.S. PATENT DOCUMENTS

| 4,219,853 | 8/1980 | Albert et al. | 360/103 |
| 4,441,131 | 4/1984 | Osanai | 360/125 X |
| 4,648,087 | 3/1987 | Scranton et al. | 360/103 |
| 4,658,314 | 4/1987 | Sasazaki | 360/103 |

FOREIGN PATENT DOCUMENTS

| 61-51615 A | 3/1986 | Japan | 360/103 |
| 61-80519 A | 4/1986 | Japan | 360/103 |

Primary Examiner—John H. Wolff
Attorney, Agent, or Firm—Guy W. Shoup; Leighton K. Chong; Paul J. Winters

[57] ABSTRACT

A magnetic head for perpendicular magnetic recording is disclosed which is composed of a substrate made of a non-magnetic material, a main pole film formed on the side surface of the substrate, a protective film for covering the main pole film, a winding core on which the substrate is pasted such that the main pole film is situated above the winding core, and a slider to which the winding core is secured through an adhesive.

2 Claims, 3 Drawing Sheets

MAGNETIC HEAD FORMED BY COMPOSITE MAIN POLE FILM AND WINDING CORE FOR PERPENDICULAR MAGNETIC RECORDING

BACKGROUND OF THE INVENTION

1. Field of the Invention

The present invention relates to a magnetic head for perpendicular magnetic recording and method of manufacturing the same and, more particularly, to a main pole excitation type magnetic head for perpendicular magnetic recording and a method for manufacturing the same.

2. Description of the Prior Art

Japanese patent Laid-Open No. 136004/1985 and Japanese patent publication No. 58730/1985, for example, disclose such a type of magnetic head for perpendicular magnetic recording.

The magnetic head for perpendicular magnetic recording disclosed in Japanese patent Laid-Open No. 136004/1985 is composed of a non-magnetic ceramic substrate, and a magnetic ferrite substrate with a groove formed in the widthwise direction on one surface. Both substrates are adhered to each other, and a main pole is formed on the adjacent surfaces of the adhered substrates such that the forward end portion of the main pole for magnetic recording is situated on the surface of the non-magnetic ceramic substrate while the base end portion of the main pole is situated on the surface of the magnetic ferrite substrate. The surfaces of both substrates on which the main pole is formed are cut to the depth at which the groove is exposed except the main pole. The surface of the non-magnetic ceramic is ground so as to constitute a floating surface with respect to a magnetic recording medium and a coil is wound around the main pole through the groove of the magnetic ferrite surface.

The magnetic head for perpendicular magnetic recording disclosed in Japanese Patent Publication No. 58730/1985 is composed of a head block component consisting of a slider portion substrate and a winding portion substrate which are made of a magnetic material, and a gap portion substrate which faces the surfaces of both substrates and is made of a non-magnetic material. At predetermined positions of the surface of the head block component, a slider portion, track portion and a gap portion are selectively formed of a thin film by evaporation, sputtering or the like.

However, the structures of both of these conventional magnetic heads for perpendicular magnetic recording are complicated, and the method of manufacturing them is therefore too complicated to ensure the dimensional accuracy.

Furthermore, since it is difficult to secure the dimensional accuracy, it is impossible to obtain sufficiently high reproducing output.

SUMMARY OF THE INVENTION

Accordingly, it is an object of the present invention to eliminate the above-described problems in the prior art and to provide a magnetic head for perpendicular magnetic recording which has a simple structure and is capable of securing dimensional accuracy so as to obtain high reproducing output.

It is another object of the present invention to provide a magnetic head for perpendicular magnetic recording which is manufactured with ease with high dimensional accuracy.

To achieve this aim, in one aspect of the present invention, a magnetic head for perpendicular magnetic recording is provided which is composed of a substrate made of a non-magnetic material, a main pole film formed on the side surface of the substrate, a protective film for covering the main pole film, a winding core on which the substrate is pasted such that the main pole film is situated above the winding core, and a slider to which the winding core is secured through an adhesive.

In another aspect of the present invention, a method of manufacturing a magnetic head for perpendicular magnetic recording is provided which is composed of the steps of forming a main pole film on a substrate, patterning the main pole film into stripes of a predetermined width, forming a protective film for covering the main pole film, cutting the substrate into a predetermined dimension, and pasting the substrate on a winding core such that the main pole film is situated above the winding core, and adhering both end portions of the winding core to a slider through an adhesive.

In a magnetic head for perpendicular magnetic recording according to the present invention, the magnetic signal picked up by the main pole film produces a reproducing voltage on the coil through a closed magnetic circuit including the winding core and the slider.

According to a method of the present invention, the substrate is pasted on the winding core such that the main pole film is situated above the winding core.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
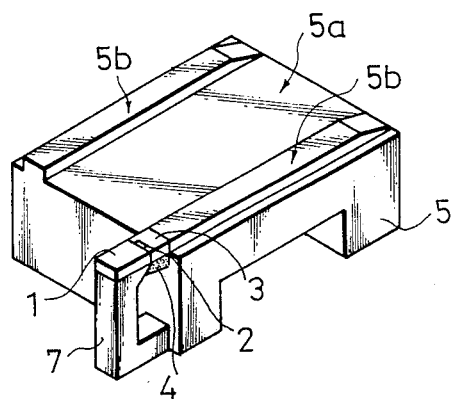
FIG. 1 is a perspective view of an embodiment of a magnetic head for perpendicular magnetic recording according to the present invention.

Referring first to FIG. 1, there is shown an embodiment of a magnetic head for perpendicular magnetic recording according to the present invention.

The magnetic head for perpendicular magnetic recording of this embodiment is composed of a substrate 1, a main pole film 2 formed on the substrate 1, a protective film 3 for covering the main pole film 2, a slider 5 and an adhesive 4 for securing the winding core 7 to the slider 5.

A method of manufacturing the magnetic head for perpendicular magnetic recording of this embodiment having the above-described structure will now be explained in the following.

Figure 2A:
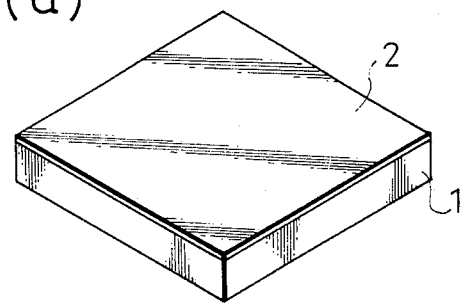
FIGS. 2(a) to 2(C) are perspective views of the subsequent manufacturing steps of the substrate shown in FIG. 1.
Figure 2B:
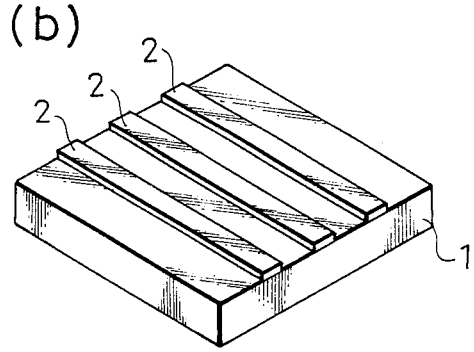

As shown in FIG. 2(a), on the substrate 1 made of a non-magnetic material such as glass, crystallized glass, ferrite, ceramic, $Al_2O_3$, and $Al_2O_3$—Tic, the thin main pole film 2 is formed by sputtering an amorphous metal of permalloy, Sendust, Co—Zr—Nb, and Co—Hf—Ta.

The density of recording lines is determined by the thickness of the main pole film 2 formed at this time.

Thereafter the main pole film 2 is patterned into stripes of a predetermined width by wet etching or dry etching. The width of the stripe pattern formed at this time equals to the width of a track which determines the density of the track.

Figure 2C:
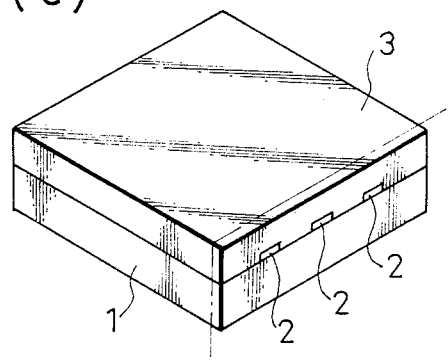

The protective film 3 is next formed on the main pole film 2 by sputtering a non-magnetic material such as $SiO_2$ and $Al_2O_3$, as shown in FIG. 2(c).

The substrate 2 on which the main pole film 2 has been formed is cut along the dot and dash line in FIG. 2(c) to obtain the substrate 1 of a predetermined dimension.

Figure 3:
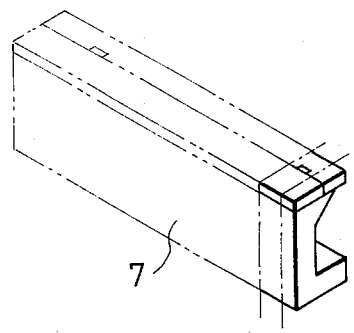
FIG. 3 is a perspective view of the manufacturing step of the winding core shown in FIG. 1.

The substrate 1 obtained in this way is pasted by glass resin, or the like on the upper surface of the winding core 7 which is formed of Mn—Zn ferrite, Ni—Zn ferrite, an amorphous metal or the like such as to have a U-shaped cross section. The winding core 7 formed in this way is cut along the dot and dash line shown in FIG. 3 to obtain the winding core 7 of a predetermined dimension.

Figure 4:
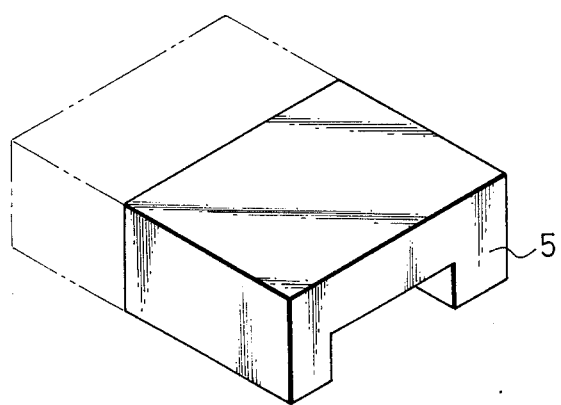
FIG. 4 is a perspective view of the manufacturing step of the slider shown in FIG. 1.

The slider 5 having a U-shaped cross section such as that shown in FIG. 4 is formed of Mn—Zn ferrite, Ni—Zn ferrite, an amorphous metal or the like. Both ends of the winding core 7 formed in this way are secured to the front end surface of the slider 5 which is closer to the right side surface by the adhesive 4 of a resin or the like.

The upper surface of the slider 5 is then ground, as shown in FIG. 1, so as to form an air groove 5a and pad surfaces 5b.

A coil is wound around the winding core 7, whereby the magnetic head for perpendicular magnetic recording of this embodiment is completed.

Although the non-magnetic member 1, the main pole film 2 and the protective film 3 are formed by sputtering in this embodiment, they may be formed by another method such as evaporation, plating and ion plating.

The upper surface of the slider 5 is ground to form the air groove 5a and the pad surfaces 5b after the winding core 7 is secured in this embodiment, but they may be formed before the winding core 7 is secured.

A method of recording or reproducing on a perpendicular magnetic recording medium using the magnetic head for perpendicular magnetic recording of this embodiment will here be explained. The perpendicular magnetic recording medium is placed on the pad surfaces 5b of the slider 5 and is moved while a signal current is energized to the coil. The magnetic flux induced on the coil acts on the perpendicular magnetic recording medium as high magnetic flux density through the winding core 7 and the very thin main pole film 2 so as to magnetize the perpendicular magnetic recording layer in the direction of thickness, thereby recording the signal.

In order to reproduce a recording signal from the perpendicular magnetic recording medium using the magnetic head for perpendicular magnetic recording of this embodiment, the signal which has been recorded on the perpendicular magnetic recording medium in the form of residual magnetism is picked up by the main pole film 2, whereby reproducing output is fetched to the coil as an induced voltage.

As described above, the magnetic head for perpendicular magnetic recording according to the present invention produces the various following effects:

(1) The structure of the core which produces high output enables recording of high track density.

(2) Since high output is obtained even when a perpendicular magnetic recording medium is at a low speed, recording of high reliability in data is enabled.

(3) The simple structure enhances the mechanical reliability between the perpendicular magnetic recording medium and the magnetic head for perpendicular magnetic recording.

According to a method of the present invention brings about the following advantages:

(1) Since one step of forming a film produces a plurality of main pole films, the productivity is enhanced.

(2) Since the thickness of the main pole film which determines the recording characteristic is determined by the film forming time of a sputtering device, a magnetic head of high accuracy is obtained.

(3) Since tracks are formed by etching, a magnetic head for perpendicular magnetic recording is manufactured with high accuracy and high productivity.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A main pole excitation type magnetic head for perpendicular magnetic recording on tracks of a recording medium moving in a horizontal direction in contact therewith, comprising:
   a slider having a horizontal medium-contacting surface on one side thereof;
   a magnetic head formed as a thin film composite of a non-magnetic substrate layer, a main pole film layer for perpendicular magentic recording having a predetermined width corresponding to the width of tracks to be recorded, and a protective film layer, said thin film magnetic head being oriented in parallel with the horizontal direction of the recording medium with the protective film layer on a leading end relative to a moving direction of the recording medium;
   a winding core formed separately from said magnetic head of a magnetic material, said winding core being secured to the slider with an adhesive and having said thin film magnetic head pasted to an end surface thereof in horizontal alignment with said medium-contacting surface of said slider.

2. A main pole excitation type magnetic head according to claim 1, wherein said slider has a pair of medium-contacting pads extending in the horizontal direction separated by an air groove, and said winding core is formed in a C-shape and secured to said slider perpendicular to the horizontal direction at a trailing end of one of said medium-contacting pads relative to the moving direction of the recording medium.

* * * * *